United States Patent [19]
Hatch et al.

[11] 3,885,006
[45] May 20, 1975

[54] COMPOSITE FRICTION ARTICLES AND METHODS OF MAKING SAME

[75] Inventors: Donald M. Hatch; George M. Studdert, both of Huntington Beach; John B. Williamson, Corona Del Mar; Roger W. Wycinowski, Fountain Valley, all of Calif.

[73] Assignee: Hitco, Irvine, Calif.

[22] Filed: May 2, 1973

[21] Appl. No.: 356,516

[52] U.S. Cl. .............. 264/29; 260/38; 260/DIG. 39
[51] Int. Cl. ............................................. B29c 25/00
[58] Field of Search ......... 106/36; 260/38, DIG. 39; 264/63, 29

[56] References Cited
UNITED STATES PATENTS

| | | | |
|---|---|---|---|
| 2,426,294 | 8/1947 | Batchelor.......................... | 106/36 X |
| 3,014,884 | 12/1961 | Brag................................. | 106/36 X |
| 3,187,089 | 6/1965 | Cosby et al...................... | 260/38 X |
| 3,301,742 | 1/1967 | Noland et al..................... | 264/63 X |

*Primary Examiner*—Donald E. Czaja
*Assistant Examiner*—S. M. Person
*Attorney, Agent, or Firm*—Fraser and Bogucki

[57] ABSTRACT

Composite friction articles comprise asbestos fibers in a resin binder which has been carbonized to improve bonding with the asbestos fibers and which contains modifiers or fillers comprising metallic chips or other relatively hard substances to impart substantial hardness to the resin binder. The composite friction articles are made by first forming a mixture of the asbestos fibers, the resin binder and the fillers. Thereafter the resin binder is cured at elevated temperatures and pressures, and subsequently carbonized at elevated pressures and even higher temperatures. The curing step may comprise a two-step process in which the mixture is first cured at 250°–400° F. and 500–12,000 psi for a relatively short period of time to drive away most of the volatiles in the resin binder and impart some hardness to the binder, after which the mixture is postcured for a longer period of time at a temperature on the order of 350°500° F. and a pressure on the order of 1,000–5,000 psi to impart substantial hardness to the resin binder. Carbonization of the resin binder may comprise a pyrolizing step in which the mixture is heated to at least 700° F. at a pressure on the order of 500–1,000 psi for a selected period of time.

8 Claims, 3 Drawing Figures

3,885,006

COMPOSITE FRICTION ARTICLES AND METHODS OF MAKING SAME

BACKGROUND OF THE INVENTION

1. Field of the Invention

The present invention relates to friction articles such as brake shoes, clutch plates and the like, and more particularly to composite friction articles which comprise asbestos fibers and modifiers or fillers in a resin binder.

2. History of the Prior Art

Friction articles have found widespread use in many applications such as in the formation of brake shoes, clutch plates and the like. Such articles must be capable of imparting a relatively high degree of friction at the consequent high temperatures of operation without significant deterioration or wear. The articles should resist significant wear at any temperature and particularly at high temperatures where brake fade is likely to result.

It has been found that friction articles having the general properties desirable for many such applications can be made from a composite of asbestos fibers in a resin binder which may or may not have modifiers or fillers added thereto. The asbestos fibers are themselves very hard and strong, have a high Young's Modulus and have many other desirable properties. However the much softer resin binder, even when fortified with relatively hard and strong fillers, results in a composite article having a number of deficiencies. The deficiencies arise primarily from the fact that the resin binder is not only relatively soft but fails to form and maintain a sufficiently strong bond with the asbestos fibers at high braking temperatures. As a result much of the effectiveness of the asbestos fibers is lost, and the composite article may consequently have less than a desirable amount of friction, and in particular may have a relatively low resistance to heat deterioration resulting in poor brake performance and excessive wear. As braking temperatures increase, the surface deteriorates as the entire composite undergoes rapid decomposition, resulting in excessive wear. While the addition of fillers such as metal chips and similar substances of substantial strength and hardness may increase the hardness of the resin binder somewhat, such binders still typically lack a desired degree of hardness, and in particular fail to bind the asbestos fibers, at high braking temperatures, to the extent necessary to substantially reduce the problems of fade and excessive wear.

BRIEF SUMMARY OF THE INVENTION

Composite friction articles in accordance with the invention include asbestos fibers within a carbon-bearing resin binder which has been heated to a temperature sufficient to carbonize the binder. The carbonized binder is relatively hard, particulary when mixed with fillers or modifiers such as metal chips, and in particular has greatly improved bonding with the asbestos fibers at temperatures in excess of those which normally decompose organic resins. The improved bonding enables the desirable frictional properties of the asbestos fibers to be better utilized. The resin binder itself is greatly hardened by the carbonization, particularly when preferred fillers have been added. The resulting composite friction article provides for greatly increased friction and resistance to high termperatures. The high temperature resistance as well as the increased hardness and strength of the composite greatly reduce fade of the composite article when used in a brake as well as reducing wear of the article in general.

In accordance with methods of making composite friction articles in accordance with the invention, a mixture of asbestos fibers and a resin binder, with or without filler material, is formed. The resulting mixture is then subjected to elevated temperatures and pressures for a relatively short period of time to drive most of the volatiles from the resin binder and effect some hardening therof. This curing step is preferably followed by a postcure in which the mixture is subjected to higher temperatures under elevated pressure and for a longer period of time to further harden the resin binder. In the carbonization step that follows, the mixture is heated at an elevated pressure to a temperature on the order of 700°F. or higher or in any event high enough to carbonize or preferably pyrolyze the resin binder. The carbonizing temperature and the time of treatment at that temperature vary with the particular materials used.

BRIEF DESCRIPTION OF THE DRAWINGS

The foregoing and other objects, features and advantages of the invention will be apparent from the following more particular description of preferred embodiments of the invention, as illustrated in the accompanying drawings, in which.

DETAILED DESCRIPTION

Composite friction articles in accordance with the invention comprise asbestos fibers which are held together by a resin binder which has been preferably mixed with an appropriate filler to add hardening and other desirable properties and which has been carbonized. The asbestos fibers may be either of the "blue" or the "white" type. The resin which must be carbon bearing is preferably of the phenolic type. The filler may comprise a mixture of one or more materials having desirable properties for a friction article such as wear resistance, oxidation resistance and high friction. Where the filler comprises two or more materials, such materials may be chosen for different reasons. Thus in some instances it may be desirable to add metal chips to the resin binder to increase wear resistance of the composite article and to add other materials which enhance the hardness of the resin binder.

Figure 1:
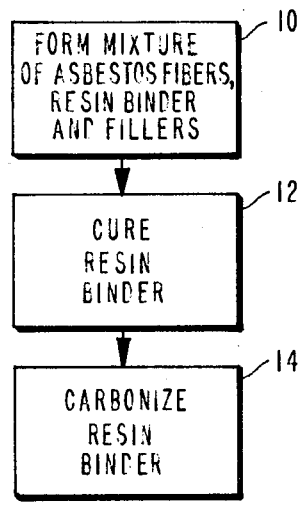
FIG. 1 is a block diagram of the successive steps in a method of making a composite friction article in accordance with the invention.

Referring to FIG. 1 the first step 10 in making a composite friction article in accordance with the invention comprises forming a mixture of asbestos fibers, a resin binder and one or more fillers where desired. The mixture which is so formed is next processed to cure the resin binder as shown in a second step 12 in FIG. 1. In a final step 14 the mixture is subjected to conditions which result in carbonization of the resin binder. During the curing step 12 the mixture is subjected to elevated temperatures, typically at elevated pressures, for a period of time long enough to drive substantially all of the volatiles from the resin binder, thereby substantially hardening the resin binder. During the carbonization step 14 the mixture is subjected to a temperature on the order of 700°F. or higher, typically under conditions of elevated pressure, so as to carbonize the resin binder.

It has been found that composite friction articles having carbonized binders in accordance with the invention have greatly improved properties, due in part to improvement of bonding of the resin binder to the asbestos fibers and to improved hardening of the resin itself. Accordingly the composite provides a high degree of friction and resists deterioration at high temperature. The reduced deterioration of the composite decreases wear of the composite in general and in particular minimizes the generation of gases and other volatiles at high temperatures which typically result in brake fade and similar phenomena.

Figure 2:
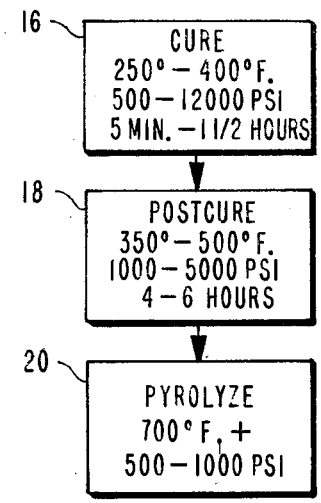
FIG. 2 is a block diagram of the successive steps which may be used in carrying out several of the steps of the method of FIG. 1.

Referring to FIG. 2 the curing step 12 of FIG. 1 may be divided into two distinct steps 16 and 18 respectfully comprising a curing step and a postcure step. The two steps 16 and 18 result in a resin binder which has been relatively thoroughly cured and which is therefore readily carbonized by further treatment. During the curing step 16 the mixture of asbestos fibers, resin binder and fillers is put through a standard compression molding cycle in which the temperature is elevated to a range on the order of 250°–400°F. and the pressure is increased to a value within a range on the order of 500–12,000 psi. The duration of such a compression molding cycle ranges from about 5 minutes to just 1½ hours and depends in part on the activity of the resin used. During the curing step 16 most of the volatiles are driven from the resin binder.

During the subsequent postcuring step 18 the mixture is again heated, preferably to a temperature within a range of 350–500°F. at an elevated pressure within a range of 1,000–5,000 psi. As the temperature of the mixture is raised, volatiles continue to be driven from the mixture as the curing process continues. The increased pressure tends to control the release of volatiles with increasing temperature, enabling the temperature of the mixture to be increased more rapidly than would otherwise be possibly and thereby speeding up the curing process. The increased pressure also helps to densify the mixture.

The postcuring step 18 is continued for a time long enough to effect substantially complete curing of the resin binder. A time within the range of 4 to 6 hours is typically involved.

As previously noted in connection with FIG. 1 the mixture upon curing of the resin binder is subjected to a sufficiently high temperature for a sufficiently long period of time to result in carbonization of the binder. Carbonization of most resins of the phenolic type results within a temperature range of 500°–700°F. However carbonization of the resin binder in accordance with the invention preferably comprises pyrolyzing the resin binder by raising the temperature thereof to at least about 700°F. at an elevated pressure within a range of about 500–1,000 psi. Temperatures well in excess of 700°F. may be desirable depending on the particular materials used. At the same time graphitization is to be avoided because of the consequent reduction in the hardness of the binder. For this reason nongraphitizing resins are typically used. The pyrolyzation process is shown as the third step 20 in the method of FIG. 2.

During the processes of FIG. 1 and FIG. 2 the asbestos fibers and the fillers remain substantially chemically inert while the resin binder is first cured and then later carbonized. Exposing the asbestos fibers to elevated temperatures under controlled conditions provides active sites for improved binder bonding. This fiber bonding is reflected in both improved mechanical strengths in composites using such activated surface fibers and in uniformity of the properties.

In one example of a composite friction article according to the invention the asbestos fibers are of a "white" (chrysotile) type sold under the trademark Canadian White by Johns-Manville Co. The asbestos fibers range in length from 7M-06 to 7F-04 and preferably comprise between 45 percent and 65 percent of the weight of the mixture.

The resins may comprise any of the products sold under the trademarks "RI-4009," "RI-4162" and "796" by Monsanto Co. Alternatively the resin may comprise the product, produced under the name "HITCO-C" by HITCO. The resin preferably comprises between 15 percent and 35 percent of the weight of the mixture.

For increased hardness and resistance to wear one or more fillers or modifiers may be added to the resin along with the asbestos fibers. The fillers may comprise barytes such as $BaSO_4$, which if used should preferably comprise between 3 percent and 5 percent of the total weight of the mixture. Other fillers which can be used include zinc which preferably comprises 3 percent to 5 percent of the total weight of the mixture when used, alumina ($Al_2O_3$) which preferably comprises 4 percent to 8 percent of the weight of the mixture when used; iron powder sold under the trademark "Iron W428" by Hoeganaes Corporation and which preferably comprises 4 percent to 8 percent of the weight of the mixture when used and, a cashew nut liquid, aldehyde condensation product sold under the trademark "Collan 10A" by Colloid Chemical Laboratories and which preferably comprises 5 percent to 10 percent of the weight of the mixture when used.

Still other fillers can be used exclusively or in conjunction with other filler materials to provide the friction article with desired properties. Such other materials include mixed brass chips which are very effective as a scavanger on the surface of a brake drum or disk, a brass powder sold under the trademark "Brass Powder No. 153" by New Jersey Zinc Company and which can be used as a friction modifier with good results, limestone ($CaCO_3$) which provides an inexpensive filler with some friction properties, zinc powder sold under the trademark "Zinc 1206" by New Jersey Zinc Company and which has been used as a stabilizer at high temperatures with good results, iron powder sold under the trademark "Iron C2024" by Hoeganaes Corporation and which is suitable for friction and noise reduction and compatible with the surface of a brake drum or disk, alumina which may be used as a friction agent at high temperatures with good results, carbon black which is a good friction modifier, ground cork which is a good friction modifier, and various aldehyde condensation products sold under the "Collan" trademark by Colloid Chemical Laboratories and including Collan 75F which is similar to Collan 10A and provides similar results, Collan 126 which provides good results so long as the carbonizing temperature is not raised much beyond 1,000° F. and Collan 2216 which comprises a good wear modifier as does Collan 126 but which is not as good as Collan 10A or Collan 75F as a friction modifier.

Figure 3:
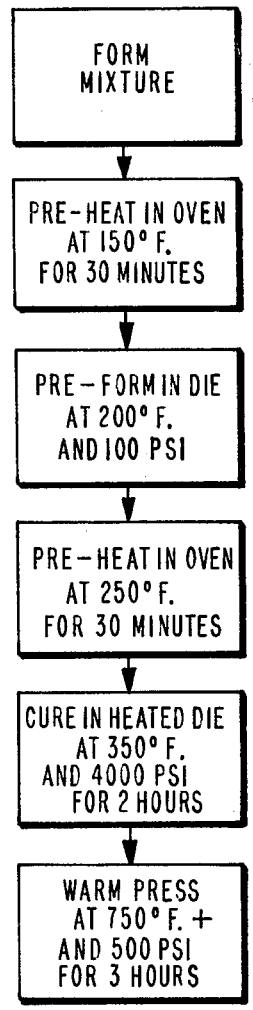
FIG. 3 is a block diagram of the detailed successive steps involved in one technique for carrying out the method of FIG. 1.

A specific example of a method of making a composite friction article in accordance with the invention is illustrated in FIG. 3. The first step of such method is to form a mixture of asbestos fibers, resin binder and appropriate fillers where desired as in the case of the methods of FIGS. 1 and 2. Next the mixture is preheated in an oven at 150° F. for approximately 30 minutes, following which the mixture is preformed in a die at 200° F. and 100 psi. The preformed mixture is then preheated in an oven at 250° F. for approximately 30 minutes, following which the mixture is then cured in a heated die at 350° F. and 4,000 psi for about 2 hours. Finally the mixture is warm pressed at temperatures on the order of 750° F. or greater at 500 psi for about 3 hours, to carbonize the resin binder.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of making a composite friction article from a mixture including asbestos fibers and a carbonizable resin comprising the steps of heating the mixture to a temperature of 250°–400° F at a pressure of 500–12,000 psi to cure the mixture, thereafter heating the mixture to a temperature of 350°–500° F at a pressure of 1,000–5,000 psi to postcure the mixture, and thereafter heating the mixture to at least 700° F at a pressure of 500–1,000 psi to pyrolyze the mixture.

2. The invention defined in claim 1, wherein the cure step is carried out for ¼–1½ hours, the postcure step is carried out for 4–6 hours, and the pyrolysis step is carried out for up to 3 hours.

3. A method of making a composite friction article from a mixture including asbestos fibers and a carbonizable resin comprising the steps of partially curing the mixture, thereafter heating the mixture to a temperature of 350°–500° F at a pressure of 1,000–5,000 psi to postcure the mixture, and thereafter heating the mixture to at least 700° F at a pressure of 500–1,000 psi to pyrolyze the mixture.

4. The invention defined in claim 3, wherein the carbonizable resin is a phenolic resin.

5. The invention defined in claim 3, wherein the mixture includes filler material mixed with the asbestos fibers and the carbonizable resin.

6. The invention defined in claim 5, wherein the asbestos fibers comprise 45–65 percent of the weight of the mixture, the resin comprises 15–35 percent of the weight of the mixture, and the filler material comprises 3–10 percent of the weight of the mixture.

7. A method of making a composite friction article from a mixture including asbestos fibers and a carbonizable resin comprising the steps of curing the mixture, thereafter postcuring the mixture at approximately 350° F and approximately 4,000 psi for approximately 2 hours, and thereafter warm pressing the mixture at at least 750° F and at least 500 psi for approximately 3 hours.

8. The invention defined in claim 7, wherein the step of curing the mixture includes the steps of pre-heating the mixture at approximately 150° F for approximately 30 minutes, thereafter pre-forming the mixture in a dye at approximately 200° F and approximately 100 psi, and thereafter pre-heating the mixture at approximately 250° F for approximately 30 minutes.

* * * * *